Dec. 18, 1951     M. E. MARTELLOTTI     2,578,712
FLUID PRESSURE BEARING
Original Filed Sept. 30, 1941
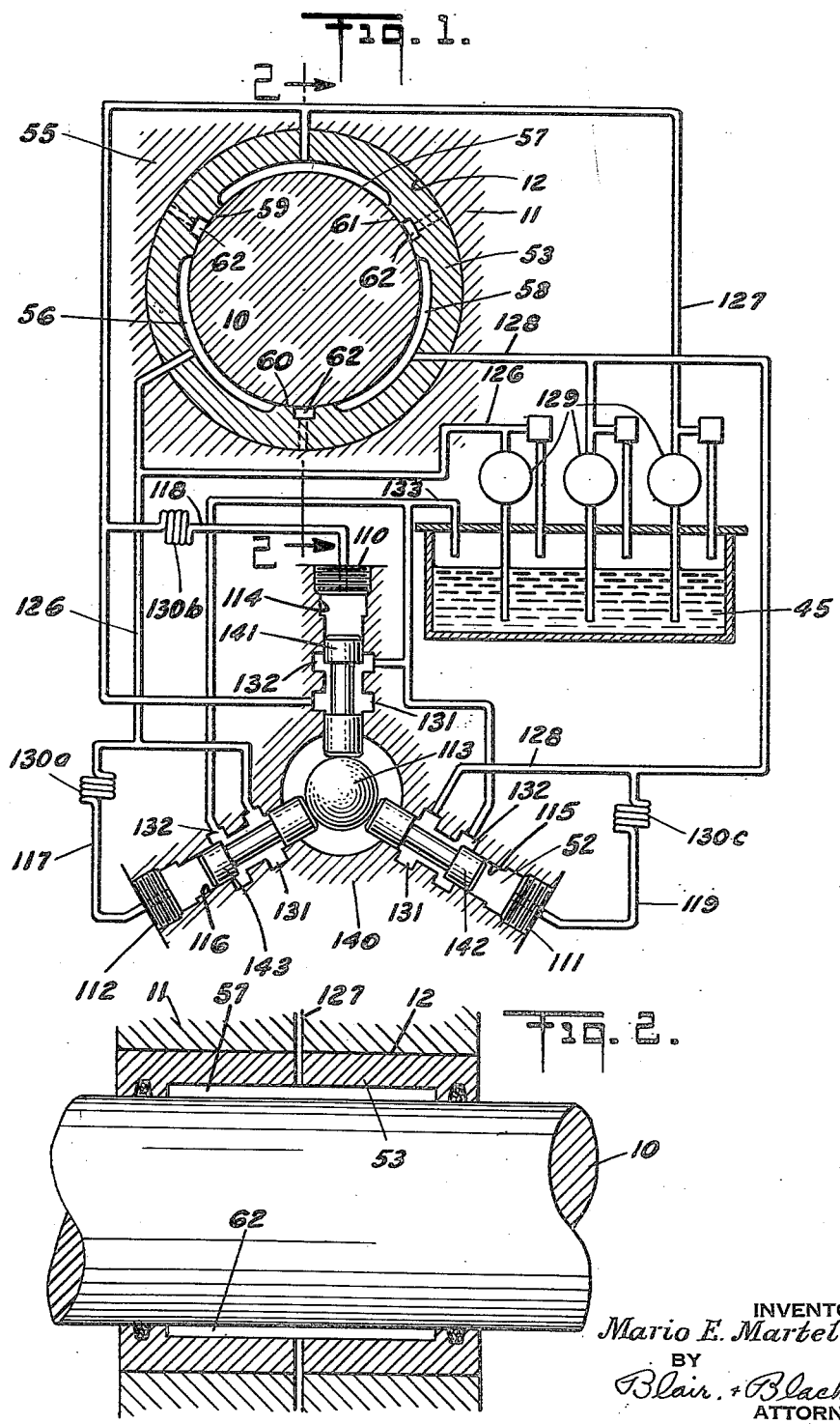

Patented Dec. 18, 1951

2,578,712

UNITED STATES PATENT OFFICE 2,578,712

FLUID PRESSURE BEARING

Mario E. Martellotti, Cincinnati, Ohio, assignor to The Cincinnati Milling Machine Company, Cincinnati, Ohio Original application September 30, 1941, Serial No. 413,005, now Patent No. 2,459,826, dated January 25, 1949. Divided and this application January 19, 1949, Serial No. 71,709

5 Claims. (Cl. 308—122)

This invention relates to improvements in bearings.

An object of this invention is to provide an improved fluid pressure type of bearing which is automatic in operation in preventing lateral displacements of a journal mounted therein.

Another object of this invention is to provide a bearing which is highly efficient in operation due to low friction losses and which will maintain the journal in the same position with respect to the bearing under both static and operating conditions.

A further object of this invention is to provide auxiliary means for amplifying pressure differentials created in a fluid pressure bearing by decentralizing movements of the journal in order to develop larger force components for opposing such movements.

Other objects and advantages of the present invention should be readily apparent by reference to the following specification, considered in conjunction with the accompanying drawing forming a part thereof, and it is to be understood that any modifications may be made in the exact structural details there shown and described, within the scope of the appended claims, without departing from or exceeding the spirit of the invention.

Referring to the drawing in which like reference numerals indicate like or similar parts:

Figure 1 is a diagrammatic view of a hydraulic control circuit illustrating the principles of this invention; and Figure 2 is a section on the line 2—2 of Figure 1.

This application is a division of my copending application entitled "Fluid Pressure Bearing," filed September 30, 1941 and bearing Serial Number 413,005, now Patent Number 2,459,826, issued January 25, 1949.

This invention deals with improvements in bearings of the type in which provision is made for creating a fluid pressure film in the bearing for supporting a journal out of metal to metal contact with the walls of the bearing and means for automatically differentiating the pressure in different parts of the film automatically in response to any lateral shifting of the journal to maintain the journal in the same position regardless of eccentric loading thereon.

In Figures 1 and 2 of the drawing, the reference numeral 10 indicates a journal, and the reference numeral 11 indicates, in general, a bearing housing in which is formed a bore 12. The reference numeral 53 indicates a sleeve fixed in the bore 12 of bearing housing 11. The sleeve 53 is provided with a plurality of pockets 56, 57 and 58 which are uniformly spaced about the journal, and these pockets are supplied with a lubricant under pressure. At the end of each pocket there are lands 59, 60, and 61, the surfaces of which lie in a circle which is slightly larger in diameter than the diameter of the journal to provide a predetermined clearance for the escape of lubricant from the pockets. Each land has a collector groove 62 formed therein, extending longitudinally of journal 10 and equidistantly spaced from the pockets adjacent thereto for collecting and returning fluid to the reservoir 45. The clearance space between the journal and each land constitutes a hydraulic resistance to the escape of fluid from each pocket and it is the amount of this clearance which determines the pressure in any given pocket. In other words, the fluid pressure in the pockets should be sufficient to support the journal and whatever load may be applied thereto in such a manner that the journal is held out of metal to metal contact with the lands and thus floats on the lubricant. Therefore, with a given supply of lubricant per unit of time, it can be computed what the necessary clearance should be to provide a desired normal working pressure in the pockets. The fluid passing through the resistances flows into the collector grooves 62.

In normal operation, the journal 10 will be supported in such position that the spacing between the journal and all of the lands will be substantially uniform, and with this condition prevailing, it should be evident that if the journal should be shifted laterally in any direction due to the application of a transient directional force thereon, that the spacing in the various resistances will be changed, thereby blocking the escape of fluid from some of the pockets and permitting a freer escape of fluid from other pockets, with the result that a pressure differential will be created between the pockets.

In other words, the pressure in the pocket opposite to the direction of the applied force will increase to oppose movement. It will be obvious in this construction that dependence must be placed upon a very small movement of the journal to produce the necessary pressure differential to oppose suddenly applied transient loads on the journal.

When these loads are large, it is difficult to obtain the necessary pressure differential between the pockets by small changes in the value of the hydraulic resistances, and therefore, and in accordance with this invention, auxiliary means have been provided for increasing the amount of the pressure differentials without necessitating an increase in the amount of movement of the journal. To this end, the pressure pockets 56, 57 and 58 are directly connected by supply lines or feed channels 126, 127 and 128, respectively, to suitable pumping means, such as individual pumps 129. Each pump has a balancing valve bypass control to reservoir 45, whereby when the balancing valves 110, 111 and 112 are in normal position, a certain quantity from each pump is bypassed or bled off to reservoir 45 or other suitable receiver, or even waste, by any suitable means, such as appropriate conduits, to maintain a normal operating pressure, but when the pressure in the pockets is unbalanced, the balancing valves shift in such a manner as to decrease the bypass flow from one pump and increase the bypass flow from the other pumps, whereby the pressure in one pocket will be raised and the pressure in the other pockets reduced.

The balancing valve assembly, generally indicated at 140, comprises three balancing valve plungers 110, 111 and 112 which are radially arranged around a central member, such as a ball 113, whereby any movement of one plunger will effect a resultant movement of the other two plungers. These plungers are reciprocally mounted in bores 114, 115 and 116, the outer ends of which are connected by branch lines 117, 118 and 119 to the supply channels 126, 127 and 128. Hydraulic resistances 130a, 130b, and 130c are positioned in branch lines 117, 118 and 119.

Each valve has a port 131 which is directly connected by a separate conduit to a separate one of the supply lines or feed channels. Each valve also has a port 132 which is connected to a reservoir line or bleed-off circuit indicated generally by the reference numeral 133. When the balancing valves are in normal position, the exhaust ports 132 are partially covered by spools 141, 142 and 143 on the balancing valve plungers 110, 111 and 112 so that there is a constant bleed-off to exhaust; and should anyone of the balancing valves shift in any axial direction, it will either increase or decrease the bleed-off flow to reservoir 45 and thereby increase or decrease the pressure in the pump supply line or channel to which it is connected.

In operation, when journal 10 is equidistantly spaced from lands 59, 60 and 61, the pressures within pockets 56, 57 and 58 are equal, the lubricant flowing from each pocket passing through the hydraulic resistances formed by the journal 10 and the lands adjacent each pocket to the collector grooves and thence to reservoir 45. When journal 10 shifts toward any given pocket because of an eccentric load thereon, the clearance space between the journal and the lands adjacent the given pocket are reduced, thus increasing the hydraulic resistance to flow of the lubricant from that pocket. At the same time, the clearance space increases between the lands and the journal on the opposite side of journal 10, thus decreasing the hydraulic reistance to flow of lubricant from the pockets positioned on the opposite side of the journal from the given pocket.

Thus, if an eccentric load moves journal 10 toward pocket 58, the pressure in pocket 58 and its supply line 128 would increase. This increase in pressure would be immediately communicated to chamber 52 in the balancing valve assembly. A rise in pressure in this chamber, which will be greater than the pressure in the remaining chambers, will cause the plunger 112 to shift radially inward, thereby reducing the bleed-off flow from line 128 through port 132 to reservoir 45. As plunger 112 shifts inwardly, it acts upon plungers 110 and 112 to move them radially outwardly, opening their ports 132. This increases the bleed-off flow from lines 126 and 127 to the reservoir 45, and thus decreases the pressure in pockets 56 and 57. Thus, the balancing valve assembly serves to accentuate the pressure differential between pockets 56 and 57 and pocket 58 during eccentric loading. When the eccentric loading on journal 10 is removed, the unequal pressures in the pockets cause the journal to move to its normal position and then the pressures automatically rebalance themselves.

There has thus been provided an improved control system for a pressure lubricant bearing which will respond to any radial shifting of the journal to effect an initial change in pressures, and these changes will act to effect further pressure differentiation and thereby a more forceful reaction to oppose eccentric loading on the journal.

As various embodiments may be made of the above invention and as many changes might be made in the embodiments above set forth, it is to be understood that all matter hereinbefore set forth or shown in the accompanying drawing is to be interpreted as illustrative and not in a limiting sense.

I claim:

1. In a fluid pressure bearing, in combination, a bearing member, a journal mounted in said bearing member, the diameters of said journal and bearing member being different to provide clearance space therebetween for relative lateral movement thereof, said bearing member having a plurality of pockets therein circumferentially spaced thereabout opening toward said journal and defining lands between adjacent pockets to provide resistance to flow through said clearance space from said pockets, pumping means, a separate lubricant supply channel connecting each pocket to the output of said pumping means, a plurality of bleed-off conduits connected respectively to said pockets, a valve structure including a plurality of individual valves each of which is disposed in a separate one of said bleed-off conduits to thereby control the rate of bleed-off of lubricant supplied through each of said channels, a separate fluid pressure-responsive means for operating each of said valves to control its bleed-off operation, and a conduit separately connecting each fluid pressure-responsive means to that pocket to which its valve is connected, whereby each valve is responsive to the pressure in the pocket to which it is connected to effect the rate of bleed-off so that an increase in the pressure in any one of the pockets will reduce bleed-off from that pocket and a decrease in the pressure in any one of the pockets will increase the bleed-off from such pocket.

2. The fluid pressure bearing as defined in claim 1 characterized by said individual valves being inter-related and arranged in relative circumferential positions corresponding to those of said pockets for radial interaction, each valve being connected through a bleed-off conduit to that pocket which is in like corresponding relative circumferential position, said fluid pressure-responsive means also being connected to said pockets in like order.

3. The fluid pressure bearing as defined in claim 1 characterized by a fixed hydraulic resistance in each of said last-mentioned conduits connecting said pressure-responsive means with said pockets.

4. In a fluid pressure bearing, in combination, interfitting bearing members in which there are circumferentially spaced hydraulic pockets in the bearing surface of one of said members opening toward the other member with remaining portions of the pocketed bearing surface constituting land areas, said bearing members being of different diameters to provide clearance space therebetween to allow for relative lateral movement thereof and to provide resistance to flow from the pockets over the land areas, pumping means, individual channels connecting each of said pockets to the output of said pumping means for delivering lubricant under pressure to each pocket, a plurality of bleed-off conduits connected respectively to said pockets, a valve structure including individual valves each connected into a separate one of said bleed-off conduits to control bleed-off flow therethrough, and means respectively connecting each of said valves hydraulically to one of said pockets so that each valve is responsive to the pressure of the pocket to which it is connected to change the rate of bleed-off therethrough, whereby upon relative lateral movement of said bearing members said valve structure causes an increase in the pressure of the lubricant in any of the pockets facing the path of such movement to oppose it and causes a decrease in the pressure of the lubricant in any of the pockets not facing said path.

5. The fluid pressure bearing as defined in claim 4 characterized by a common control member, said valves including plungers radially arranged about said control member in relative circumferential positions corresponding to the relative circumferential positions of said pockets with said control member being freely movable in all directions with respect to said plungers so that radial movement of one of said plungers causes proportionate reverse movement of the other plungers, each of said valves having an inlet port connected by its bleed-off conduit to the pocket in the corresponding relative position and an exhaust port with the plunger of that valve controlling rate of bleed-off flow therethrough.

MARIO E. MARTELLOTTI.

REFERENCES CITED

The following references are of record in the file of this patent:

UNITED STATES PATENTS

| Number | Name | Date |
|---|---|---|
| 2,062,250 | Moller | Nov. 24, 1936 |